(12) United States Patent
Cohn

(10) Patent No.: US 6,910,133 B1
(45) Date of Patent: Jun. 21, 2005

(54) REFLECTED INTERRUPT FOR HARDWARE-BASED ENCRYPTION

(75) Inventor: Jonathan Daniel Cohn, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/546,797

(22) Filed: Apr. 11, 2000

(51) Int. Cl.[7] .............................. G06F 12/14; H04L 9/32
(52) U.S. Cl. .................. 713/190; 713/191; 713/192; 713/160; 380/239; 370/235
(58) Field of Search ........................ 713/190, 191, 713/192, 160; 380/239; 370/235; 718/105

(56) References Cited

U.S. PATENT DOCUMENTS

| | | | |
|---|---|---|---|
| 4,161,719 A | | 7/1979 | Parikh et al. ............... 340/147 |
| 4,672,534 A | * | 6/1987 | Kamiya ...................... 714/30 |
| 5,241,599 A | | 8/1993 | Bellovin et al. ............. 380/21 |
| 5,291,482 A | | 3/1994 | McHarg et al. ............... 370/60 |
| 5,303,237 A | | 4/1994 | Bergman et al. ........... 370/85.6 |
| 5,345,446 A | | 9/1994 | Hiller et al. ............... 370/60.1 |
| 5,351,136 A | | 9/1994 | Wu et al. .................... 358/440 |
| 5,361,362 A | * | 11/1994 | Benkeser et al. ........... 709/102 |
| 5,416,842 A | | 5/1995 | Aziz ........................... 380/30 |
| 5,561,669 A | | 10/1996 | Lenney et al. ............. 370/60.1 |
| 5,734,654 A | | 3/1998 | Shirai et al. ................ 370/396 |
| 5,764,772 A | | 6/1998 | Kaufman et al. ............. 380/30 |
| 5,793,763 A | | 8/1998 | Mayes et al. ................ 370/389 |
| 5,913,045 A | | 6/1999 | Gillespie et al. ............ 395/309 |
| 5,920,572 A | | 7/1999 | Washington et al. ........ 370/535 |
| 5,941,964 A | | 8/1999 | Young et al. ............... 710/100 |
| 5,953,336 A | | 9/1999 | Moore et al. ............... 370/395 |
| 6,064,677 A | * | 5/2000 | Kappler et al. ........ 370/395.43 |
| 6,067,301 A | * | 5/2000 | Aatresh ...................... 370/418 |
| 6,320,964 B1 | * | 11/2001 | Callum ....................... 380/29 |
| 6,519,636 B2 | * | 2/2003 | Engel et al. ............... 709/223 |

OTHER PUBLICATIONS

Author unknown; "Interface Queue Management" White Paper; Aug. 3, 1995; Cisco, pp. 1–12.*
Mano et al.; Logic and Computer Design Fundamentals; Sep. 17, 1999; Prentice–Hall, Inc.; 2nd Edition; pp. 339–389, 467–510.*
Peterson et al.; Computer Networks; Oct. 1, 1999; Morgan Kaufmann; 2nd Edition; pp. 447–526.*
Leung, Kin K.; "An Execution/Sleep Scheduling Policy for Serving an Additional Job in Priority Queuing Systems"; Apr. 1993; ACM; vol. 40, No. 2; pp. 394–417.*
Varma et al.; "Hardware Implementation of Fair Queuing Algorithms for ATM Networks"; Dec. 1997; IEEE; pp. 54–68.*
IPSec Network Security, pp. 1–69, printed from http://www.cisco.com/univercd/cc/td/doc/products/software/ios113ed/113t/113t 3/ipsec.

* cited by examiner

Primary Examiner—Gilberto Barron
Assistant Examiner—Jung W Kim
(74) Attorney, Agent, or Firm—Thelen Reid & Priest LLP; Marc S. Hanish

(57) ABSTRACT

A router may induce a reflected interrupt to indicate to a processor in the router to execute encryption or decryption commands on packets in an input queue. The reflected interrupt may have a lower priority than interrupts generated for the processing of time-critical packets. This prevents starvation of potentially important packets while still providing for the security of a critical section for encryption and decryption commands. The router may also be designed to detect when a predefined event occurs and stop the execution of encryption or decryption commands accordingly. This is especially useful for preventing the starvation of lower priority packets, as the encryption or decryption processing loop may be stopped intermittently to allow the processor to perform other tasks. Scheduling of the encryption or decryption process may also help prevent traffic-related problems.

88 Claims, 2 Drawing Sheets

REFLECTED INTERRUPT FOR HARDWARE-BASED ENCRYPTION

BACKGROUND OF THE INVENTION

1. Field of the Invention

The present invention relates to the field of network routers. More specifically, the present invention relates to the use of a reflected interrupt to execute encryption-related processing of packets by a router.

2. The Background

An Internetwork Operating System (IOS) is a system that provides common functionality, scalability, and security for all products contained in a computer network. It generally allows centralized, integrated, and automated installation and management of internetworks, while ensuring support for a wide variety of protocols, media, services, and platforms.

Traditionally, IOS has been implemented in software. However, it can be much more efficient to implement certain aspects of IOS in hardware. This allows not only the obvious advantage of hardware execution of commands (which is usually much faster than software execution), but also the advantage of permitting some commands to be run in parallel with commands being executed in software, creating efficiency through pipelining.

One area in which this offloading of IOS functionality to hardware is especially effective is in encryption. In order to provide security, most IOS implementations include an encryption library, a series of commands for implementing security-relation encryption. Generally such commands are executed on packets received or sent by a router. Since most routers receive a large amount of traffic, the speed and efficiency of the execution of such commands are of utmost concern to manufacturers.

When such commands were implemented solely in software, it was common for the software to be divided into two separate parts: public and restricted. The public portion would contain public keys and subroutines, while the restricted portion would contain protected source code and cryptographic libraries. Execution of commands would involve calls between these two parts.

With the movement towards hardware implementation, the commands may now be implemented in a hardware-based encryption accelerator. A hardware application program interface (API) is created which replaces the calls between the public and restricted parts by interfacing with the hardware-based encryption accelerator.

There are generally three types of encryption/decryption commands. The first is registration. These are simply the commands used to indicate to the API that hardware encryption is going to be performed. Commands of this type may be executed fairly rarely, such as only when the IOS is initialized.

A second group of encryption/decryption commands includes protocol commands. These are commands which indicate the proper protocol that commands to the driver should be in, as well as the protocol the driver will use for responding. These commands are also executed fairly rarely, such as perhaps once every day or so.

The third group of encryption/decryption commands includes bulk encryption and decryption. Commands of this type do the actual work of encrypting and decrypting packets, as well as error-correcting. Commands of this type are executed very often and are therefore the most important to consider when speed and efficiency is an issue.

Typically, when a bulk encryption or decryption command is executed, the hardware is placed in what is known as a critical section. During the critical section, network interrupts are generally masked so that no packets may be handled until after the encryption or decryption process has finished. Parallel execution of commands is limited to other encryption or decryption commands. This is necessary to ensure proper security. Unfortunately, there are several problems that arise with such an implementation.

If the encryption or decryption commands are being executed on fairly large packets, there is a possibility of non-encryption-related commands on other packets not being executed for long periods of time since the IOS is stuck in the critical section. This is known as starvation, and also may occur if a large number of packets requiring encryption or decryption are received within a relatively short period of time. If these starved packets are time-sensitive, such as Voice-over-IP packets, then starvation becomes an even bigger problem.

Additionally, given the speed at which the hardware implementation is able to execute, it is generally a good idea to keep all the queues full to ensure proper efficiency of system resources.

What is needed is a solution which prevents the starvation of time-critical packets as well as ensures proper efficiency of system resources.

SUMMARY OF THE INVENTION

A router may induce a reflected interrupt to indicate to a processor in the router to execute encryption or decryption commands on packets in an input queue. The reflected interrupt may have a lower priority than interrupts generated for the processing of time-critical packets. This prevents starvation of potentially important packets while still providing for the security of a critical section for encryption and decryption commands. The router may also be designed to detect when a predefined event occurs and stop the execution of encryption or decryption commands accordingly. This is especially useful for preventing the starvation of lower priority packets, as the encryption or decryption processing loop may be stopped intermittently to allow the processor to perform other tasks. Scheduling of the encryption or decryption process may also help prevent traffic-related problems.

DETAILED DESCRIPTION OF A PREFERRED EMBODIMENT

Figure 1:
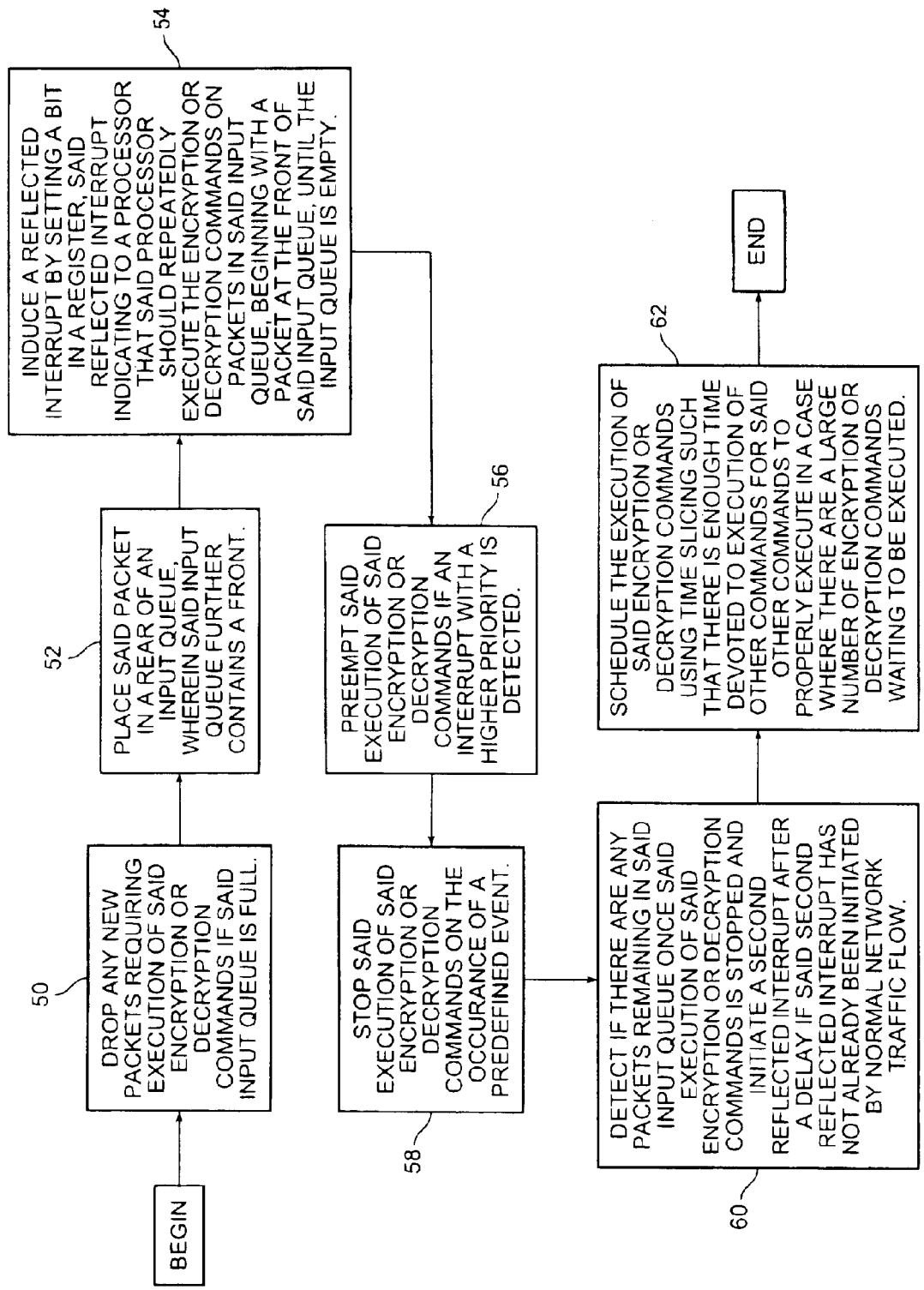
FIG. 1 is a flow diagram illustrating a method for executing encryption or decryption commands on a packet in a computer network in accordance with a presently preferred embodiment of the present invention.

In the following description, a preferred embodiment of the invention is described with regard to preferred process steps and data structures. However, those skilled in the art will recognize, after perusal of this application, that embodiments of the invention may be implemented using at least one general purpose computer operating under program control, and that modification of the general purpose computer to implement the components, process steps, and/or data structures described herein would not require undue invention.

In accordance with a presently preferred embodiment of the present invention, the components, process steps, and/or data structures are implemented using an IOS. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA (field programmable gate array) or ASIC (application specific integrated circuit) technology, or the like, may also be used without departing from the scope and spirit of the inventive concepts disclosed herewith.

An interrupt is a signal that gets the attention of the CPU to perform or stop performing a task. An interrupt generally involves a hardware device, but some software functions may generate interrupts as well. In a presently preferred embodiment of the present invention, a bit is defined in a hardware register on the encryption accelerator that induces an interrupt to the CPU when the bit is set. The same interrupt line may be used by an encryption accelerator (the hardware which performed encryption/decryption) to indicate the completion of an operation.

When a packet is received which requires encryption or decryption, the encryption accelerator may place that packet in a queue or start processing it immediately. Either way, it may induce the reflected interrupt. The reflected interrupt signal indicates to the CPU that it should process encryption or decryption commands on packets as long as there is work available. This is known as the encryption/decryption processing loop, where the CPU will continue to process these commands until the appropriate queue is empty or a higher-priority interrupt breaks the loop. In order to prevent starvation of time-critical or otherwise higher priority packets, the reflected interrupt may be set at a lower priority than "more important" or time-critical interrupts (such as those that would be triggered upon receipt of voice-over-IP packets).

This design allows for high efficiency and speed, without starvation of higher priority packets. One potential problem with this design, however is that when the system is under stress (receiving a lot of packets needing encryption or decryption), it is still possible for the network to starve lower priority packets. For example, there are still copying, encapsulation, checksum calculating, and other relatively low priority commands that need execution. If these commands suffer from starvation, the queues they are placed in may fill up and packets may have to be discarded. Additionally, even thought these commands may be low-priority, that does not necessarily mean they are "no-priority". There may still be delay problems if these commands aren't executed every so often.

In a presently preferred embodiment of the present invention, this problem may be alleviated by exiting the encryption/decryption processing loop when a certain condition is met. This condition may be set to be based on a number of iterations or bytes processed, or by the amount of time that has passed since entering the loop. This allows lower-priority commands to be executed at an interval of the designer's choosing, in order to maximize the time spent in the loop while minimizing the possibility of adverse starvation of lower-priority commands.

However, this solution creates a few additional issues. If the encryption/decryption loop happens to halt (due to the amount of time the loop has been executing, or the number of iterations or bytes processed) and network activity happens to halt around the same time, there may be some packets awaiting encyrption/decryption still stuck on the queue leading to the encryption accelerator. Without additional packets to trigger the CPU to enter a critical section again, these stuck packets may never get executed. Therefore, a detector may be placed in the system to determine if there are any packets remaining in the encryption/decryption queue when the encryption/decryption loop is halted, and then to initiate another reflected interrupt after a certain period of time if one is not triggered as part of the normal network traffic flow.

Another problem that may be encountered is that simply exiting the encryption/decryption loop may not allow the "normal" processing of a packet to proceed because the number of packets requiring encryption/decryption may be arriving so fast as to be triggering reflected interrupts immediately after the loop is exited (i.e. not giving enough time for any "normal" processing to occur). This issue may be alleviated by scheduling the processing loop, such as by time-slicing, wherein there are certain scheduled times during which encryption/decryption simply will not occur, allowing the system to "catch up" with its normal processing chores during these times if necessary. Obviously, the choice of time-slicing patterns is very important since such time slicing invariably will cut into the efficiency of the handling of packets. Another possible solution involves simply dropping input packets if the queue is full, thus avoiding the problem entirely.

FIG. 1 is a flow diagram illustrating a method for executing encryption or decryption commands on a packet in a computer network in accordance with a presently preferred embodiment of the present invention. At 50, the packet may be placed in a rear of an input queue, wherein said input queue further contains a front. At 52, a reflected interrupt may be induced by setting a bit in a register, said reflected interrupt indicating to a processor that said processor should repeatedly execute the encryption or decryption commands on packets in said input queue, beginning with a packet at the front of said input queue, until the input queue is empty. The reflected interrupt may have a lower priority than interrupts generated for time-critical commands. At 54, the execution of said encryption or decryption commands should be stopped if an interrupt with a higher priority is detected.

At 56, the execution of said encryption or decryption commands may be stopped on the occurrence of a predefined event, such as when the number of bytes processed reaches a predefined limit, when the number packets to which said encryption or decryption commands has been executed reaches a predefined limit, or when the time spent executing said encryption or decryption commands reaches a predefined limit.

At 58, the router may detect if there are any packets remaining in said input queue once said execution of said encryption or decryption commands is stopped and initiate a second reflected interrupt after a delay if said second reflected interrupt has not already been initiated by normal network traffic flow. Then, at 60, the execution of said encryption or decryption commands may be scheduled, such that there is enough time devoted to execution of other commands for said other commands to properly execute even in a case where there are a large number of encryption or decryption commands waiting to be executed. Time slicing may be used for the scheduling. Lastly, at 62, any new packets requiring execution of said encryption or decryption commands may be dropped if the input queue is full.

Figure 2:
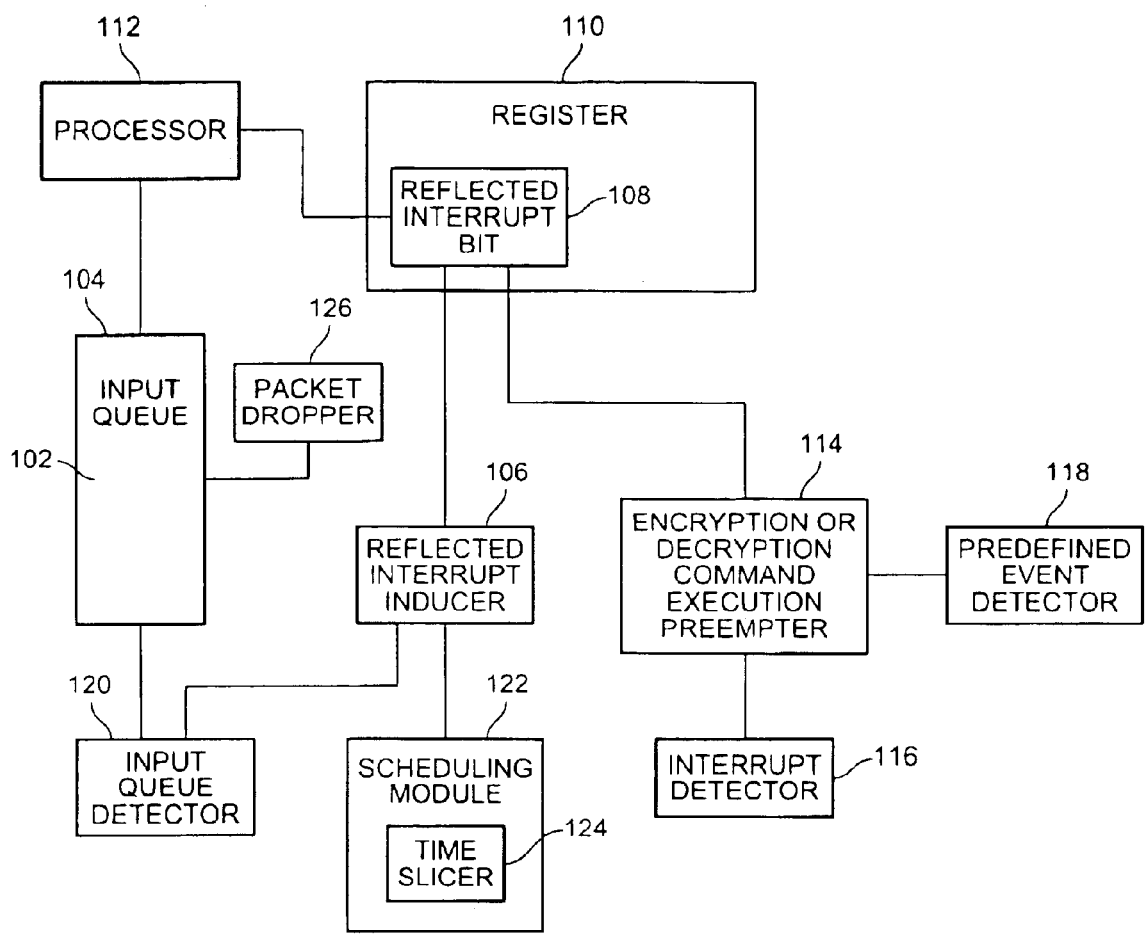
FIG. 2 is a block diagram illustrating a router for executing encryption or decryption commands on a packet in a computer network in accordance with a presently preferred embodiment of the present invention.

FIG. 2 is a block diagram illustrating a router for executing encryption or decryption commands on a packet in a computer network in accordance with a presently preferred embodiment of the present invention. The packet may be placed in the rear 100 of an input queue 102, wherein said input queue further contains a front 104. A reflected interrupt inducer 106 coupled to a bit 108 in a register 110 may induce a reflected interrupt by setting the bit 108 in a register 110, the reflected interrupt bit 108 coupled to a processor 112 which is coupled to the input queue 102. The reflected interrupt bit 108, when set, indicates to a processor 112 that said processor 112 should repeatedly execute the encryption or decryption commands on packets in said input queue 104, beginning with a packet at the front 106 of said input queue 104, until the input queue 104 is empty. The reflected interrupt may have a lower priority than interrupts generated for time-critical commands, which may set a time-critical interrupt bit 114 in the register 110. An encryption or decryption command execution terminator 116 coupled to said reflected interrupt bit 108 may stop the execution of said encryption or decryption commands if an interrupt with a higher priority is detected by an interrupt detector 118 coupled to said encryption or decryption command execution terminator 116.

A predefined event detector 120 coupled to said encryption or decryption command execution terminator 116 may signal to the encryption or decryption command execution terminator 116 to stop the execution of said encryption or decryption commands on the occurrence of a predefined event, such as when the number of bytes processed reaches a predefined limit, when the number packets to which said encryption or decryption commands has been executed reaches a predefined limit, or when the time spent executing said encryption or decryption commands reaches a predefined limit. Thus, the predefined event detector 120 may be a byte count detector, a packet count detector, or a timer.

An input queue detector 122 coupled to the input queue 102 and to the reflected interrupt inducer 106 may detect if there are any packets remaining in the input queue 102 once the execution of said encryption or decryption commands is stopped and signal to the reflected interrupt inducer 106 to initiate a second reflected interrupt after a delay if said second reflected interrupt has not already been initiated by normal network traffic flow. A scheduling module 124 coupled to said reflected interrupt inducer 106 may schedule the execution of said encryption or decryption commands such that there is enough time devoted to execution of other commands for said other commands to properly execute even in a case where there are a large number of encryption or decryption commands waiting to be executed. A time slicer 126 may be located on the scheduling module 124 to perform time slicing for the scheduling. Any new packets requiring execution of said encryption or decryption commands may be dropped if the input queue 102 is full by a packet dropper 128 coupled to said input queue 102.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for executing encryption or decryption commands on a packet in a computer network including:
   receiving a packet requiring encryption or decryption at an encryption accelerator;
   inducing a reflected interrupt from said encryption accelerator to a processor by setting a bit in a register, said reflected interrupt indicating to said processor that said processor should execute the encryption or decryption commands until there are no more encryption or decryption commands to execute; and
   stopping said execution of said encryption or decryption commands if an interrupt with a higher priority is detected by said processor.

2. The method of claim 1, wherein said reflected interrupt has a lower priority than interrupts generated for time-critical commands.

3. The method of claim 1, further including stopping said execution of said encryption or decryption commands once the number of bytes processed reaches a predefined limit.

4. The method of claim 1, further including stopping said execution of said encryption or decryption commands once the number of commands executed reaches a predefined limit.

5. The method of claim 1, further including stopping said execution of said encryption or decryption commands once the time spent executing said encryption or decryption commands reaches a predefined limit.

6. The method of claim 3, further including detecting if there are any packets upon which it is necessary to execute said encryption or decryption commands once said execution of said encryption or decryption commands is stopped and initiating a second reflected interrupt after a delay if said second reflected interrupt has not already been initiated by normal network traffic flow.

7. The method of claim 4, further including detecting if there are any packets upon which it is necessary to execute said encryption or decryption commands once said execution of said encryption or decryption commands is stopped and initiating a second reflected interrupt after a delay if said second reflected interrupt has not already been initiated by normal network traffic flow.

8. The method of claim 5, further including detecting if there are any packets upon which it is necessary to execute said encryption or decryption commands once said execution of said encryption or decryption commands is stopped and initiating a second reflected interrupt after a delay if said second reflected interrupt has not already been initiated by normal network traffic flow.

9. The method of claim 1, further including scheduling said execution of said encryption or decryption commands such that there is enough time devoted to execution of other commands for said other commands to properly execute even in a case where there are a large number of encryption or decryption commands waiting to be executed.

10. The method of claim 9, wherein said scheduling includes time slicing.

11. The method of claim 1, further including dropping any new packets requiring execution of said encryption or decryption commands if an input queue is full.

12. A method for executing encryption or decryption commands on a packet in a computer network including:
   receiving a packet requiring encryption or decryption at an encryption accelerator;
   placing said packet in a rear of an input queue, wherein said input queue further contains a front;
   inducing a reflected interrupt from said encryption accelerator to a processor by setting a bit in a register, said reflected interrupt indicating to said processor that said processor should repeatedly execute the encryption or decryption commands on packets in said input queue, beginning with a packet at the front of said input queue, until the input queue is empty; and stopping said execution of said encryption or decryption commands if an interrupt with a higher priority is detected by said processor.

13. The method of claim 12, wherein said reflected interrupt has a lower priority than interrupts generated for time-critical commands.

14. The method of claim 12, further including stopping said execution of said encryption or decryption commands once the number of bytes processed reaches a predefined limit.

15. The method of claim 12, further including stopping said execution of said encryption or decryption commands once the number packets to which said encryption or decryption commands has been executed reaches a predefined limit.

16. The method of claim 12, further including stopping said execution of said encryption or decryption commands once the time spent executing said encryption or decryption commands reaches a predefined limit.

17. The method of claim 14, further including detecting if there are any packets remaining in said input queue once said execution of said encryption or decryption commands is stopped and initiating a second reflected interrupt after a delay if said second reflected interrupt has not already been initiated by normal network traffic flow.

18. The method of claim 15, further including detecting if there are any packets remaining in said input queue once said execution of said encryption or decryption commands is stopped and initiating a second reflected interrupt after a delay if said second reflected interrupt has not already been initiated by normal network traffic flow.

19. The method of claim 16, further including detecting if there are any packets remaining in said input queue once said execution of said encryption or decryption commands is stopped and initiating a second reflected interrupt after a delay if said second reflected interrupt has not already been initiated by normal network traffic flow.

20. The method of claim 12, further including scheduling said execution of said encryption or decryption commands such that there is enough time devoted to execution of other commands for said other commands to properly execute even in a case where there are a large number of encryption or decryption commands waiting to be executed.

21. The method of claim 20, wherein said scheduling includes time slicing.

22. The method of claim 12, further including dropping any new packets requiring execution of said encryption or decryption commands if said input queue is full.

23. A router for executing encryption or decryption commands on a packet in a computer network including:
a processor;
an encryption accelerator coupled to said processor;
a register having a reflected interrupt bit coupled to said processor and to said encryption accelerator;
a reflected interrupt inducer coupled to said reflected interrupt bit;
an encryption or decryption command execution terminator coupled to reflected interrupt bit; and
an interrupt detector coupled to said encryption or decryption command execution terminator.

24. The router of claim 23, further including a time-critical interrupt bit coupled to said processor, said time-critical interrupt bit having a higher priority than said reflected interrupt bit.

25. The router of claim 23, further including a byte count detector coupled to said encryption or decryption execution terminator.

26. The router of claim 23, further including a packet count detector coupled to said encryption or decryption execution terminator.

27. The router of claim 23, further including a timer coupled to said encryption or decryption execution terminator.

28. The router of claim 25, further including an input queue detector coupled to said reflected interrupt inducer.

29. The router of claim 26, further including an input queue detector coupled to said reflected interrupt inducer.

30. The router of claim 27, further including an input queue detector coupled to said reflected interrupt inducer.

31. The router of claim 23, further including a scheduling module coupled to said reflected interrupt inducer.

32. The router of claim 31, wherein said scheduling module includes a time slicer.

33. The router of claim 23, further including:
an input queue, said input queue coupled to said processor; and
a packet dropper coupled to said input queue.

34. A router for executing encryption or decryption commands on a packet in a computer network including:
a processor;
an encryption accelerator coupled to said processor;
an input queue coupled to said processor;
a register having a reflected interrupt bit coupled to said processor and to said encryption accelerator;
a reflected interrupt inducer coupled to said reflected interrupt bit;
an encryption or decryption command execution terminator coupled to reflected interrupt bit; and
an interrupt detector coupled to said encryption or decryption command execution terminator.

35. The router of claim 34, further including a time-critical interrupt bit coupled to said processor, said time-critical interrupt bit having a higher priority than said reflected interrupt bit.

36. The router of claim 34, further including a byte count detector coupled to said encryption or decryption execution terminator.

37. The router of claim 34, further including a packet count detector coupled to said encryption or decryption execution terminator.

38. The router of claim 35, further including a timer coupled to said encryption or decryption execution terminator.

39. The router of claim 36, further including an input queue detector coupled to said reflected interrupt inducer and to said input queue.

40. The router of claim 37, further including an input queue detector coupled to said reflected interrupt inducer and to said input queue.

41. The router of claim 38, further including an input queue detector coupled to said reflected interrupt inducer and to said input queue.

42. The router of claim 34, further including a scheduling module coupled to said reflected interrupt inducer.

43. The router of claim 42, wherein said scheduling module includes a time slicer.

44. The router of claim 34, further including a packet dropper coupled to said input queue.

45. A program storage device readable by a machine, tangibly embodying a program of instructions executable by the machine for executing encryption or decryption commands on a packet in a computer network, the method including:

receiving a packet requiring encryption or decryption at an encryption accelerator;

inducing a reflected interrupt from said encryption accelerator to a processor by setting a bit in a register, said reflected interrupt indicating to said processor that said processor should execute the encryption or decryption commands until there are no more encryption or decryption commands to execute; and stopping said execution of said encryption or decryption commands if an interrupt with a higher priority is detected by said processor.

46. A program storage device readable by a machine, tangibly embodying a program of instructions executable by the machine for executing encryption or decryption commands on a packet in a computer network, the method including:

receiving a packet requiring encryption or decryption at an encryption accelerator;

placing said packet in a rear of an input queue, wherein said input queue further contains a front;

inducing a reflected interrupt from said encryption accelerator to a processor by setting a bit in a register, said reflected interrupt indicating to said processor that said processor should execute the encryption or decryption commands until there are no more encryption or decryption commands to execute; and stopping said execution of said encryption or decryption commands if an interrupt with a higher priority is detected by said processor.

47. An apparatus for executing encryption or decryption commands on a packet in a computer network including:

means for receiving a packet requiring encryption or decryption at an encryption accelerator;

means for inducing a reflected interrupt from said encryption accelerator to a processor by setting a bit in a register, said reflected interrupt indicating to said processor that said processor should execute the encryption or decryption commands until there are no more encryption or decryption commands to execute; and means for stopping said execution of said encryption or decryption commands if an interrupt with a higher priority is detected by said processor.

48. An apparatus for executing encryption or decryption commands on a packet in a computer network including:

means for receiving a packet requiring encryption or decryption at an encryption accelerator;

means for placing said packet in a rear of an input queue, wherein said input queue further contains a front;

means for inducing a reflected interrupt from said encryption accelerator to a processor by setting a bit in a register, said reflected interrupt indicating to said processor that said processor should execute the encryption or decryption commands until there are no more encryption or decryption commands to execute; and means for stopping said execution of said encryption or decryption commands if an interrupt with a higher priority is detected by said processor.

49. The program storage device of claim 45, wherein said reflected interrupt has a lower priority than interrupts generated for time-critical commands.

50. The program storage device of claim 45, wherein the method further includes stopping said execution of said encryption or decryption commands once the number of bytes processed reaches a predefined limit.

51. The program storage device of claim 45, wherein the method further includes stopping said execution of said encryption or decryption commands once the number of commands executed reaches a predefined limit.

52. The program storage device of claim 45, wherein the method further includes stopping said execution of said encryption or decryption commands once the time spent executing said encryption or decryption commands reaches a predefined limit.

53. The program storage device of claim 51, wherein the method further includes detecting if there are any packets upon which it is necessary to execute said encryption or decryption commands once said execution of said encryption or decryption commands is stopped and initiating a second reflected interrupt after a delay if said second reflected interrupt has not already been initiated by normal network traffic flow.

54. The program storage device of claim 51, wherein the method further includes detecting if there are any packets upon which it is necessary to execute said encryption or decryption commands once said execution of said encryption or decryption commands is stopped and initiating a second reflected interrupt after a delay if said second reflected interrupt has not already been initiated by normal network traffic flow.

55. The program storage device of claim 52, wherein the method further includes detecting if there are any packets upon which it is necessary to execute said encryption or decryption commands once said execution of said encryption or decryption commands is stopped and initiating a second reflected interrupt after a delay if said second reflected interrupt has not already been initiated by normal network traffic flow.

56. The program storage device of claim 45, wherein the method further includes scheduling said execution of said encryption or decryption commands such that there is enough time devoted to execution of other commands for said other commands to properly execute even in a case where there are a large number of encryption or decryption commands waiting to be executed.

57. The program storage device of claim 56, wherein said scheduling includes time slicing.

58. The program storage device of claim 45, wherein the method further includes dropping any new packets requiring execution of said encryption or decryption commands if an input queue is full.

59. The program storage device of claim 46, wherein said reflected interrupt has a lower priority than interrupts generated for time-critical commands.

60. The program storage device of claim 46, wherein the method further includes stopping said execution of said encryption or decryption commands once the number of bytes processed reaches a predefined limit.

61. The program storage device of claim 46, wherein the method further includes stopping said execution of said encryption or decryption commands once the number of commands executed reaches a predefined limit.

62. The program storage device of claim 46, wherein the method further includes stopping said execution of said encryption or decryption commands once the time spent executing said encryption or decryption commands reaches a predefined limit.

63. The program storage device of claim 61, wherein the method further includes detecting if there are any packets upon which it is necessary to execute said encryption or decryption commands once said execution of said encryption or decryption commands is stopped and initiating a second reflected interrupt after a delay if said second reflected interrupt has not already been initiated by normal network traffic flow.

64. The program storage device of claim 61, wherein the method further includes detecting if there are any packets upon which it is necessary to execute said encryption or decryption commands once said execution of said encryption or decryption commands is stopped and initiating a second reflected interrupt after a delay if said second reflected interrupt has not already been initiated by normal network traffic flow.

65. The program storage device of claim 62, wherein the method further includes detecting if there are any packets upon which it is necessary to execute said encryption or decryption commands once said execution of said encryption or decryption commands is stopped and initiating a second reflected interrupt after a delay if said second reflected interrupt has not already been initiated by normal network traffic flow.

66. The program storage device of claim 65, wherein the method further includes scheduling said execution of said encryption or decryption commands such that there is enough time devoted to execution of other commands for said other commands to properly execute even in a case where there are a large number of encryption or decryption commands waiting to be executed.

67. The program storage device of claim 66, wherein said scheduling includes time slicing.

68. The program storage device of claim 46, wherein the method further includes dropping any new packets requiring execution of said encryption or decryption commands if an input queue is full.

69. The apparatus of claim 47, wherein said reflected interrupt has a lower priority than interrupts generated for time-critical commands.

70. The apparatus of claim 47, further including means for stopping said execution of said encryption or decryption commands once the number of bytes processed reaches a predefined limit.

71. The apparatus of claim 47, further including means for stopping said execution of said encryption or decryption commands once the number of commands executed reaches a predefined limit.

72. The apparatus of claim 47, further including means for stopping said execution of said encryption or decryption commands once the time spent executing said encryption or decryption commands reaches a predefined limit.

73. The apparatus of claim 71, further including means for detecting if there are any packets upon which it is necessary to execute said encryption or decryption commands once said execution of said encryption or decryption commands is stopped and initiating a second reflected interrupt after a delay if said second reflected interrupt has not already been initiated by normal network traffic flow.

74. The apparatus of claim 72, further including means for detecting if there are any packets upon which it is necessary to execute said encryption or decryption commands once said execution of said encryption or decryption commands is stopped and initiating a second reflected interrupt after a delay if said second reflected interrupt has not already been initiated by normal network traffic flow.

75. The apparatus of claim 73, further including means for detecting if there are any packets upon which it is necessary to execute said encryption or decryption commands once said execution of said encryption or decryption commands is stopped and initiating a second reflected interrupt after a delay if said second reflected interrupt has not already been initiated by normal network traffic flow.

76. The apparatus of claim 47, further including means for scheduling said execution of said encryption or decryption commands such that there is enough time devoted to execution of other commands for said other commands to properly execute even in a case where there are a large number of encryption or decryption commands waiting to be executed.

77. The apparatus of claim 76, wherein said scheduling includes time slicing.

78. The apparatus of claim 48, further including means for dropping any new packets requiring execution of said encryption or decryption commands if an input queue is full.

79. The apparatus of claim 48, wherein said reflected interrupt has a lower priority than interrupts generated for time-critical commands.

80. The apparatus of claim 48, further including means for stopping said execution of said encryption or decryption commands once the number of bytes processed reaches a predefined limit.

81. The apparatus of claim 48, further including means for stopping said execution of said encryption or decryption commands once the number of commands executed Teaches a predefined limit.

82. The apparatus of claim 48, further including means for stopping said execution of said encryption or decryption commands once the time spent executing said encryption or decryption commands reaches a predefined limit.

83. The apparatus of claim 81, further including means for detecting if there are any packets upon which it is necessary to execute said encryption or decryption commands once said execution of said encryption or decryption commands is stopped and initiating a second reflected interrupt after a delay if said second reflected interrupt has not already been initiated by normal network traffic flow.

84. The apparatus of claim 82, further including means for detecting if there are any packets upon which it is necessary to execute said encryption or decryption commands once said execution of said encryption or decryption commands is stopped and initiating a second reflected interrupt after a delay if said second reflected interrupt has not already been initiated by normal network traffic flow.

85. The apparatus of claim 83, further including means for detecting if there are any packets upon which it is necessary to execute said encryption or decryption commands once said execution of said encryption or decryption commands is stopped and initiating a second reflected interrupt after a delay if said second reflected interrupt has not already been initiated by normal network traffic flow.

86. The apparatus of claim 48, further including means for scheduling said execution of said encryption or decryption commands such that there is enough time devoted to execution of other commands for said other commands to properly execute even in a case where there are a large number of encryption or decryption commands waiting to be executed.

87. The apparatus of claim 86, wherein said scheduling includes time slicing.

88. The apparatus of claim 48, further including means for dropping any new packets requiring execution of said encryption or decryption commands if an input queue is full.

* * * * *

UNITED STATES PATENT AND TRADEMARK OFFICE
CERTIFICATE OF CORRECTION

PATENT NO.   : 6,910,133 B1
DATED        : June 21, 2005
INVENTOR(S)  : Cohn

It is certified that error appears in the above-identified patent and that said Letters Patent is hereby corrected as shown below:

Column 12,
Line 24, replace "Teaches" with -- reaches --.

Signed and Sealed this

Seventh Day of February, 2006

JON W. DUDAS
*Director of the United States Patent and Trademark Office*